United States Patent [19]

Danielsen

[11] 4,069,644
[45] Jan. 24, 1978

[54] PACKING MACHINE FOR FISH
[75] Inventor: Odd Danielsen, Stavanger, Norway
[73] Assignee: Chr. Bjelland & Co. A/S, Stavanger, Norway
[21] Appl. No.: 790,380
[22] Filed: Apr. 25, 1977
[30] Foreign Application Priority Data
  May 7, 1976 Norway .................................. 761583
[51] Int. Cl.² ........................ B65B 57/20; B65B 35/44; B65B 35/56
[52] U.S. Cl. ..................................... 53/59 R; 53/142; 53/159
[58] Field of Search ................ 53/59 R, 142, 143, 159
[56] References Cited
U.S. PATENT DOCUMENTS

| 3,451,191 | 6/1969 | Eriksen ................................... 53/142 |
| 3,822,528 | 7/1974 | Carlsson et al. ...................... 53/159 |
| 3,902,587 | 9/1975 | Checcucci .......................... 53/159 X |

Primary Examiner—Travis S. McGehee
Attorney, Agent, or Firm—Ladas, Parry, Von Gehr, Goldsmith & Deschamps

[57] ABSTRACT

An improvement on a packing machine for packing whole fish in tins, especially brisling, young herring, sardines or the like. The machine has a chain- or belt-conveyor with holders for each individual fish and a feed device, carrying fish which have been given a uniform orientation in respective supply means positioned on both sides of the conveyor. The holders on the chain or belt conveyor are arranged such that they can be lowered flush with or below the transport plane of the conveyor, such that a plurality of fish lie freely movable at the end section of the packing machine. A transfer conveyor overlaps said first conveyor and moves at a lower linear velocity than said first conveyor. Means are arranged at the transfer conveyor for pushing the fish together.

9 Claims, 3 Drawing Figures

PACKING MACHINE FOR FISH

The present invention relates to a packing machine for packing whole fish in tins, especially brisling, young herring, sardines or the like, the machine having a transport member comprising a chain or belt conveyor with holders for each individual fish, a feed device, carrying fish which have been given a uniform orientation in respective supply means positioned on both sides of the conveyor, which guides the fish into the holders such that every other fish lies with its tail in one direction and the alternate fish lie with their tails in the opposite direction, and a transfer device which is adapted to transport a predetermined number of fish from the end of the transport member over into the packing container.

A packing machine of this general type is known from Norwegian Patent No. 107,896.

One of the problems with the packing machines known previously has been that the fish have easily become damaged. The known machines work by gripping each individual fish by mechanical means, and this understandably enough has resulted in damage to the fish.

Another disadvantage with the machines known to date is that, in order to accomplish this mechanical gripping of each fish, it has been necessary to have a plurality of mechanical parts which, in the first place, gradually wear out and must be replaced, and, secondly, which result in a very high noise level during operation.

The necessity of gripping each individual fish mechanically has also meant that the capacity of such machines has not been as high as desirable.

From conventional packaging machines such as that disclosed in German Patent Publication No. 2,420,123, for example, it is known to arrange a transport path for individual units of goods where guide means for each separate unit of goods are provided on the transport path. These guide carriers can be lowered beneath the transport plane prior to the transfer of the goods to a transit conveyor which carries the goods to the place where they are to be packaged.

The aim of the present invention is to improve upon the fish packing machines discussed above, inter alia, through the application of the technology known from conventional packaging machines, so that the fish can be packed more quickly and more reliably into the packaging container, without damage to the fish and with as low a noise level as possible on the machinery. It is also our purpose to provide a construction which is inexpensive to make, inexpensive to operate, and which requires little maintenance.

This is achieved according to the invention with an improvement on whole fish packing machines of the type discussed introductorily, the improvement being characterized in that the holders on a first chain or belt conveyor, in a manner known per se, are arranged such that they can be lowered flush with or below the transport plane of the conveyor, leaving a number of fish lying freely movable on the end portion of the packing machine, a transfer conveyor then being provided which overlaps with the first conveyor but which moves at a lower linear velocity than said first conveyor, and where means for pushing the fish together are disposed at said second transfer conveyor.

A practical and preferred embodiment of the invention is further characterized in that the discharge end of the transfer conveyor travels over a drive roller with a free wheel mechanism, and an arm is attached to this roller which can be moved by a cylinder or the like which receives an impulse for a rapid movement from a counter on the transport member when a predetermined number of fish has passed the counter, the result of this rapid movement then being that a spatial separation is created between groups of fish of the predetermined number. A further feature of this embodiment is the provision, above the cord or chain transfer conveyor, of one or possibly two pushers for a group of fish which lies freely movable on the cord conveyor, said pushers being capable of being raised and lowered and moved back and forth, and whose pushing speed is greater than the linear velocity of the cord or chain conveyor. This embodiment is further characterized in that the discharge end of the chain or belt conveyor is deflected down, such that the holders are guided down below the transport plane for the fish, there being arranged in between the chains or belts of said conveyor, belts, cords or chains which travel at the same speed as those conveyor chains (or belts) which carry the holders, said belts, cords or chains being made to travel in the transport plane of the fish for a distance beyond the deflected portion of the conveyor.

A further feature characterizing the invention is that the feed device to the transport member comprises a carriage or slide which is provided with pockets, said pockets having two flaps opening at the bottom such that the fish can be slipped down into the holders on the conveyor, the slide or carriage being adapted so as to be capable of moving at a speed synchronous with the chain or belt conveyor during the transfer of the fish from the feed device to the holders on the conveyor.

The invention will be explained in more detail in the following with reference to the figures, which show schematically one preferred embodiment of the invention.

Figure 1:
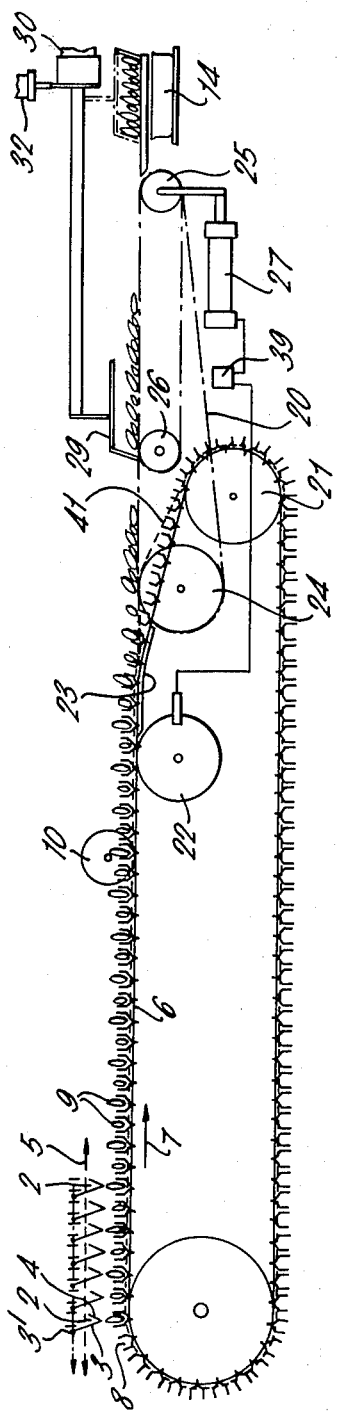
FIG. 1 is a sketch of an embodiment of the invention.

The feed device for the packing machine consists of a carriage or slide 1 which has a plurality of pockets 2. Each of the pockets has sloping flaps 3 and 4 at the bottom, of which at least one flap 3 is pivotable about an axis 3'. The fish, bellies up, are disposed on opposite sides of the carriage, the fish on both sides having been oriented with their heads facing in toward the carriage, and are then fed alternately, first from one side, then from the other, into the pockets 2, so that the heads of every other fish all face in one direction and the heads of the alternate fish all face in the opposite direction.

The slide 1 is made to move in the direction of the arrow 5 at a speed synchronous with that of the upper part of a conveyor 6 which moves in the direction of the arrow 7. A plurality of transport holders 8 to receive the fish from the feed carriage 1 are arranged on the conveyor 6. The conveyor 6 consists of four mutually spaced, parallel belts to which said holders 8 are attached. In other words, the fish 9 are moved in the direction of the arrow 7 by means of the conveyor 6. At both sides of the conveyor, head- or tail-cutting knives 10 are arranged, and optionally, a washing device (not shown). After passing the knives 10, the fish 9 continue along the conveyor 6.

Near the discharge end of the conveyor 6 with its holders 8, a cord conveyor 20 is disposed which overlaps the discharge end of the conveyor 6, the cords 20 extending into the interstices between the belts of the conveyor 6. At its discharge end, the conveyor 6 is led down below the level of the transport plane for the fish and turns over a driven end roller 21 which lies at a lower level than the other rollers for the conveyor. This downward deflection of the chain can be effected by means of a curved plate 23 or in some other practical manner.

Figure 2:
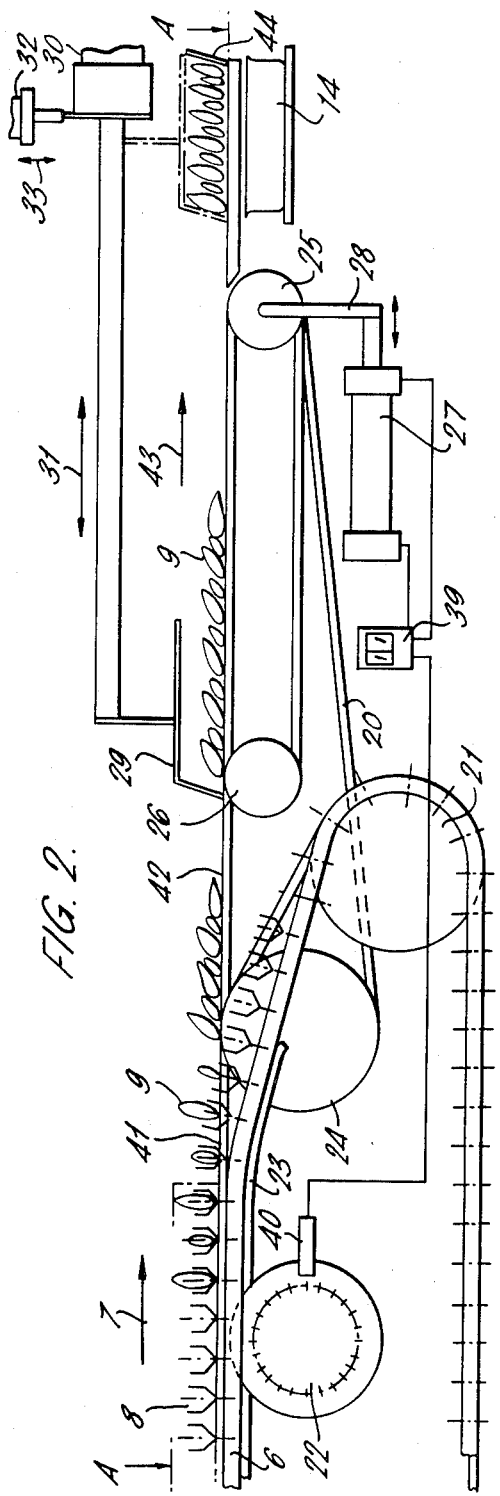
FIGS. 2 and 3 show, on a somewhat larger scale and in more detail, elevation and plan views, respectively, of the discharge end of the device.

As seen on FIG. 2, there will be a gap between the deflected portion of the chain conveyor 6 and the beginning of the cord conveyor 20. This gap is bridged over by cords which run together with and in between the chains of the conveyor 6, but which are guided over pulleys having the same diameter and rotating about the same axis as the pulley 24 before being turned about the driven end roller 21. These cords 41 thus bridge over said gap.

Figure 3:
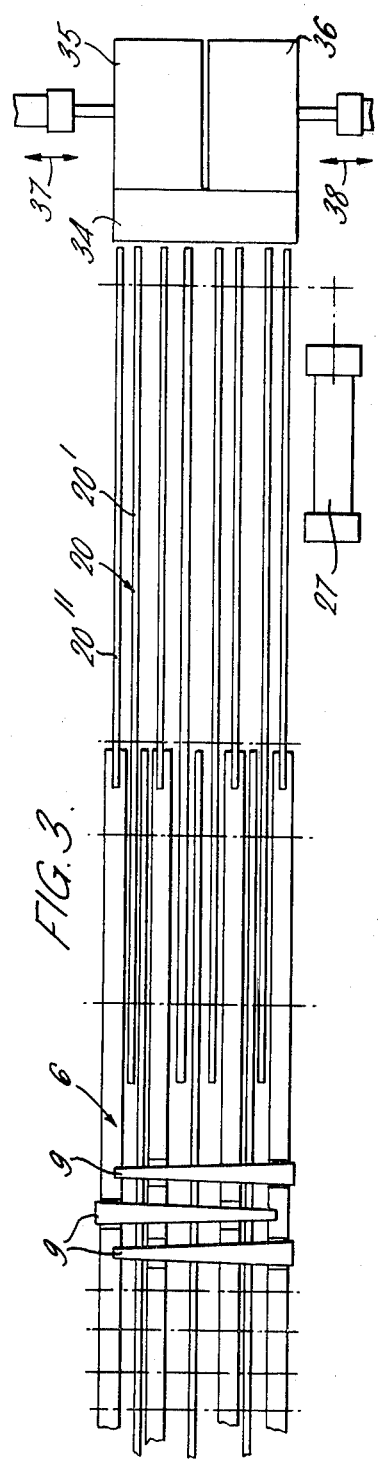

The cord conveyor 20 travels over a free wheel 24 which lies in back of the driven end roller 21 for the conveyor 6, and the cords in the cord conveyor 20 run in between the cords of the cord conveyor 41 as shown on FIG. 3. The cords 20' of the cord conveyor 20 are driven by a drive roller 25 at the discharge end. Shorter filler cords 20" also run over this roller 25, their purpose simply being to fill in the spaces between the cords 20'. The cords 20' and 20" move at the same speed. The cords 20" travel over a roller 26 which lies clear of the end of the conveyor 6. The drive roller 25 has a free wheel mechanism and can be affected in the free direction by means of a cylinder 27 which acts on the roller via a rod 28 located in the end of the cylinder's piston rod. A pusher 29 is positioned above the conveyor 20, the pusher being movable from a rear position, indicated by the solid lines in FIG. 2, to the forward position indicated by the broken lines in FIG. 2. The pusher is moved back and forth as indicated by the arrows 31 by means of a cylinder 30. A second cylinder 32 can move the pusher and its cylinder 30 up and down as indicated by the arrows 33. The pusher 29 pushes the fish 9 over a stationary guide plate 34 and onto two movable plates 35 and 36 which are positioned above the packaging container 14. The plates 35 and 36 can be moved laterally in the directions indicated by the arrows 37 and 38.

The cylinder 27 receives an impulse for motion via the roller 22 from a counter 39 which, through a sensor 40, counts a predetermined number of fish, for example, the eleven fish shown on FIG. 2.

The device shown on the drawings works in the following manner: Fish are drawn into the pockets 2, preferably by means of gripping devices which take hold of the heads of the fish. The fish are supplied from suitable guides on both sides of the conveyor which orient the fish uniformly, heads facing toward the conveyor and bellies up. The carriage or slide 1 is made to move at a speed synchronous with the forward motion of the conveyor 6 in the direction of the arrow 7, so that the pockets 2 of the feed device are positioned above the holders 8 on the conveyor. In this position, the flaps 3 and 4 open, and the six fish of FIG. 1 slide from the pockets 2 into their respective holders 8 on the conveyor 6. The fish then lie with their backs in the bottom of the holders, and their heads and tails are cut off by means of knives 10 on each side of the conveyor. They may then be subjected to a washing process. When the fish reach the deflected portion of the conveyor 6, the holders will be guided down below the transport plane for the fish, while the fish lie free on top of the cords 41, and are transported by these cords over to the cord conveyor 20. The conveyor 20 does not travel as fast as the conveyor 41, so the fish 9 will be moved closer together as they enter onto conveyor 20. When a predetermined number of fish have come onto the conveyor 20, the cylinder 27 receives an impulse from the counter 39 and the rod 28 moves quickly, causing the roller to free wheel. The predetermined number of fish lying on the conveyor 20 will thus be jerked forward and a spatial separation will be created between this group of fish and the continuous row of fish coming from the conveyor 41. Into this space, the pusher 29 descends and then moves quickly in the direction of the arrow 43 until it assumes the end position shown by the broken lines in FIG. 2. All of the fish in this group now lie tightly compressed between the pusher 29 and a stationary vertical plate 44. When the group of fish has assumed this position, the plates 35 and 36 are quickly drawn back in their respective directions, and the fish fall down into the container 14. The pusher 29 with its cylinder 30 is then raised up by means of the cylinder 32 and is moved back to the starting position, where it is moved down into the space in back of a new group of fish, and the entire procedure is repeated.

As one can see, no gripping of each individual fish is necessary with this system, because all of the movement of the fish takes place either while the fish is held loosely in its holder on the conveyor 6 or when it lies free on the conveyor 20, and the fish are pushed together both by means of cord conveyors which are moved at different speeds and by a pusher 29 when the fish lie free on the conveyor 20 and the plates 34, 35 and 36. There is thus very little risk of damaging the fish. This device also offers high operational reliability, because there are few mechanical parts which can wear out. In addition, the machine operates at a low noise level, because there are few mechanical parts, such as rods and the like which are moved relative to one another and thus make noise.

Having described my invention, I claim:

1. A packing machine for packing whole fish in tins, especially brisling, young herring, sardines or the like, comprising a first conveyor having a receiving position and a discharge position and carrying a plurality of holders spaced apart therealong for receiving respective fish and holding said fish in a uniform orientation with respect to the transport direction of the first conveyor as they are conveyed to the discharge position, means defining a packing station at which groups of fish are placed in respective tins, a second conveyor for receiving fish successively from the discharge position of the first conveyor and transferring the fish to the packing station, drive means for driving the first conveyor and for driving the second conveyor at a lower speed than the first conveyor whereby the fish received successively by the second conveyor from the discharge position of the first conveyor are positioned closer together on the second conveyor than they were on the first conveyor, and pusher means for pushing a plurality of fish together on the second conveyor whereby the fish are delivered in groups to the packing station.

2. A packing machine as claimed in claim 1, comprising means for lowering the holders of the first conveyor with respect to the second conveyor at said discharge position whereby transfer of the fish from the first conveyor to the second conveyor is effected.

3. A packing machine as claimed in claim 2, wherein the first conveyor comprises a plurality of endless flexible strands entrained about rollers and each carrying a set of holders spaced apart therealong, and the second conveyor comprises a plurality of endless flexible strands entrained about rollers and positioned between the strands of the first conveyor at the discharge position thereof, the strands of the second conveyor becoming higher than the strands of the first conveyor at the discharge position whereby fish in the holders of the first conveyor are lifted out of the holders onto the second conveyor at said discharge position.

4. A packing machine as claimed in claim 1, comprising means for creating a gap on the second conveyor between a predetermined number of fish received thereon and fish subsequently received thereon, and means for introducing the pusher means into said gap whereby each group of fish delivered to the packing station contains said predetermined number of fish.

5. A packing machine as claimed in claim 4, wherein the second conveyor has a discharge end adjacent to the packing station and comprises at least one endless flexible strand entrained about a drive roller at the discharge end of the second conveyor, the drive roller having a free wheel mechanism, the machine further comprising means for counting the number of fish received on the second conveyor, an arm connected to the drive roller, and actuation means which respond to the counted number of fish reaching said predetermined number by rapidly moving said arm and thereby creating said gap between the counted predetermined number of fish on the second conveyor and fish subsequently received thereon.

6. A packing machine as claimed in claim 1, wherein the pusher means comprise at least one pusher and means for raising and lowering the pusher with respect to the second conveyor and moving the pusher forwards and backwards with respect to the direction of movement of the second conveyor, the speed of movement of the pusher in the direction of movement of the second conveyor being greater than the speed of movement of the second conveyor.

7. A packing machine as claimed in claim 1, wherein the first conveyor comprises a first plurality of endless flexible strands entrained about rollers and each carrying a set of holders spaced apart therealong, and a second plurality of endless flexible strands entrained about rollers and positioned between the strands of the first plurality, the strands of the first plurality defining a transport plane for the fish extending from the receiving position of the first conveyor to the discharge position thereof, where the strands of the first plurality are deflected downwardly with respect to the transport plane, and the strands of the second plurality extending at the level of the transport plane to a position beyond the discharge position, whereby the fish are lifted from the holders onto the strands of the second plurality at the discharge position, the drive means being connected to drive the first and second pluralities of strands at the same speed.

8. A packing machine as claimed in claim 7, wherein the second conveyor comprises a plurality of endless flexible strands entrained about rollers and positioned between the strands of the second plurality of the first conveyor at the discharge position thereof, the strands of the second conveyor extending at the level of the transport plane whereby fish carried by the strands of the second plurality of the first conveyor become transferred to the second conveyor.

9. A packing machine as claimed in claim 1, comprising a feed device for placing fish in the holders respectively at the receiving end of the first conveyor, the feed device comprising a carriage provided with pockets, said pockets having flaps which can be opened at the bottom so that the fish can slide from the pockets into the holders of the first conveyor, and the machine further comprising means for driving the carriage at the same speed as the first conveyor during transfer of fish from the feed device to the holders of the first conveyor.

* * * * *